United States Patent

Hershler

[15] 3,705,375
[45] Dec. 5, 1972

[54] ELECTRODE FOR ELECTRIC HUMIDITY SENSOR

[72] Inventor: Abe Hershler, Flushing, N.Y.

[73] Assignee: Phys-Chemical Research Corp., New York, N.Y.

[22] Filed: July 7, 1971

[21] Appl. No.: 160,383

[52] U.S. Cl. ................338/35, 200/61.06, 340/235
[51] Int. Cl. ............................................H01c 13/00
[58] Field of Search ................338/34, 35; 337/300; 300/61.04, 61.06; 73/335, 336.5, 338; 261/129; 340/235; 324/65 R

[56] References Cited

UNITED STATES PATENTS

| | | | |
|---|---|---|---|
| 2,064,651 | 12/1936 | Fiene | 338/35 X |
| 2,728,831 | 12/1955 | Pope | 338/35 |
| 2,466,903 | 4/1949 | Low et al. | 338/35 |

*Primary Examiner*—C. L. Albritton
*Attorney*—Stanley Wolder

[57] ABSTRACT

An electric humidity transducer includes a body member coated with a sensing layer having a resistivity responsive to ambient humidity and a pair of spaced thin electrodes adherent to the sensing layer. The electrodes each comprise a porous, flexible, polymeric resin, adhesive binder bonding a mixture of carbon black and graphite. The ratio of carbon black to graphite is between 2:8 and 6:4, and the electrode contains between 7 and 11 parts of the binder and 8 to 12 parts of the carbon black and graphite mixture.

10 Claims, 3 Drawing Figures

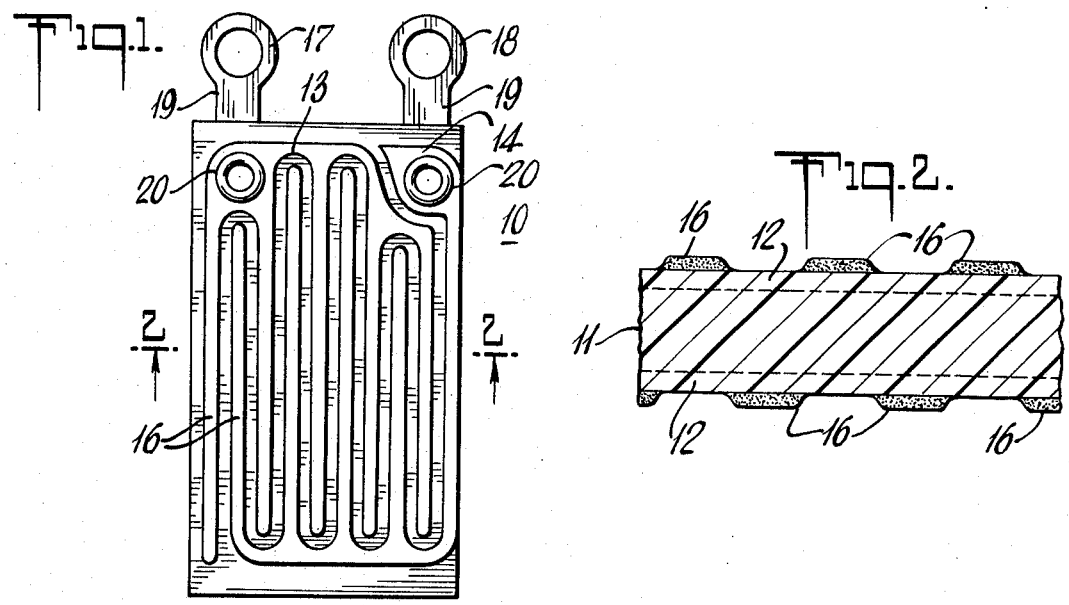
Fig.1.
Fig.2.
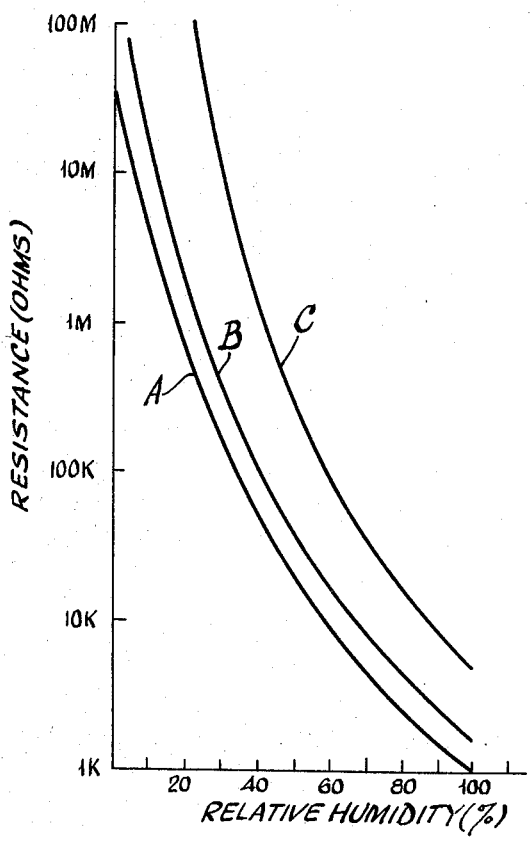
Fig.3.
INVENTOR
ABE HERSHLER
BY
Stanley Wolder
ATTORNEY

3,705,375

ELECTRODE FOR ELECTRIC HUMIDITY SENSOR

BACKGROUND OF THE PRESENT INVENTION

The present invention relates generally to improvements in electrode compositions and it relates particularly to a transducer or sensing device having an electric parameter responsive to an ambient condition and including an improved electrode system which facilitates the sensing of the electrical parameter.

In the measurement of relative humidity many types of devices have been employed both of a mechanical and electrical nature. By reason of their relatively rapid response, compactness, versatility and adaptability the electrical humidity measuring devices are highly preferred. These are typified by ionic type humidity sensors which are provided with surfaces whose electrical resistance varies with the ambient humidity, for example, a thin film of aqueous lithium chloride or a thin layer of an ion exchange material as described in U.S. Pat. No. 2,728,831 granted Dec. 27, 1955 to M. Pope. The electrical type humidity transducer includes a body member or substrate provided with a sensing layer which varies in resistance in response to the ambient humidity and a pair of spaced electrodes superimposed on the sensing layer to facilitate the measurement of its resistance. While the conventional electrical type humidity transducer is employed to great advantage it possesses some drawbacks and disadvantages among which are the presence of hysteresis, a reduced speed of response, a lack of high stability, and a significant calibration shift with aging.

SUMMARY OF THE INVENTION

It is a principal object of the present invention to provide an improved electrical transducer.

Another object of the present invention is to provide an improved electrode composition.

Still another object of the present invention is to provide an improved electric humidity sensor.

A further object of the present invention is to provide an improved transducer having a resistance responsive to the ambient humidity and characterized by its reliability, stability, high speed of response, low hysteresis and high versatility and adaptability.

The above and other objects of the present invention will become apparent from a reading of the following description taken in conjunction with the accompanying drawing which illustrates a preferred embodiment thereof.

It has been discovered that the particular electrode that is used to effect an electrical contact with the surface of an ionic type humidity sensor is very important in that the electrodes influence the calibration of the humidity sensor and its other parameters such as speed of response and hysteresis and, in addition, the electrode is one of the most important factors in the sensor durability and stability. Also, inasmuch as ionic type sensors are subject to polarization effects the electrode is the only component part of the sensor that can be easily altered to minimize polarization. The electrode composition is thus an important consideration in optimizing the above factors. It has been a common practice to employ metallic electrodes in paste form, for example, a silver paste. It has been found that metallic electrodes other than pure gold produce long term instability in ionic type humidity sensors due to ion migration from the electrode into the surrounding sensor body. This phenomena is particularly noticeable with silver, ferrous and copper electrode pastes; the sensor bulk surrounding the electrode begins to darken as the metallic ion migrates into the region adjacent to the electrode.

It has been discovered that the drawbacks and disadvantages of the conventional electrode in an electric humidity sensor are overcome by the use of an electrode composition comprising a mixture of carbon black and graphite dispersed in or bonded by a matrix or binder which is preferably non-ionic or is very weakly ionic. The electrodes are advantageously applied to the humidity responsive substrate by suspending the carbon black, graphite and binder in a highly volatile solvent which is miscible with the binder to produce a free flowing gel which is applied to the desired area of the substrate in any suitable manner, such as by silk screening, and then evaporating the solvent. The solvent is advantageously of a type which moderately swells the ion exchange resin surface, when such is employed, to aid in embedding the electrode therein.

Accordingly, the present invention, in a sense, contemplates the provision of a sensing device comprising a substrate having an electrical parameter responsive to an ambient condition and an electrode adherent to the substrate and including a mixture of carbon black and graphite bonded by a binder.

The weight ratio of carbon black to graphite is advantageously between 2:8 and 6:4, preferably between 3:7 and 5:5, for example 4:6. The weight ratio of the carbon, both carbon black and graphite, to the adhesive binder or matrix is advantageously between 12:7 and 8:11, preferably between 11:8 and 9:10, for example 10:9. The binder adhesive is advantageously flexible and of relatively low cohesiveness to avoid deformation of the sensing surface. Moreover, the electrode is advantageously porous so as to permit the free traverse thereof of water molecules. The electrode is in the form of a thin coating on the substrate and is advantageously of a thickness between 0.0005 and 0.005 inch; preferably between 0.002 and 0.004 inch.

The improved humidity transducer is characterized by high stability and reliability, rapid response and a minimum hysteresis characteristic.

BRIEF DESCRIPTION OF THE DRAWING

FIG. 1 is a plan view of a humidity transducer embodying the present invention;

FIG. 2 is an enlarged fragmentary sectional view taken along line 2 — 2 in FIG. 1; and FIG. 3 is a graph illustrating the variation with time of the response characteristics of transducers in accordance with the present invention and with past practice.

DESCRIPTION OF THE PREFERRED EMBODIMENT

Referring now to the drawing, particularly FIGS. 1 and 2 thereof which illustrate a preferred embodiment of the present invention, the reference numeral 10 generally designates the improved ambient humidity transducer which is of the type described in the above identified Pope patent. The transducer 10 includes a rectangular base section 11 having an integrally formed thin humidity responsive layer 12 and is produced in the manner generally described in the above identified Pope patent. Specifically the base section 11 is formed of cross-linked polystyrene possessing 8 percent divinylbenzene cross-linking. The humidity responsive layer 12 is an ion exchange resin which is produced by first sulfonating a face of the cross-linked polystyrene body member and then treating the sulfonated layer with a salt solution, preferably a lithium salt, to put the sulfonated layer in the lithium ion state, the subsequently dried layer defining the ion exchange resin humidity sensitive layer 12.

In order to facilitate the measurement of the resistivity of humidity sensing layer 12 a pair of spaced electrodes 13 and 14 formed of thin layers of an electrode composition, as will be hereinafter described, are superimposed on and anchored to the substrate defining sensing layer 12 on each opposite face of the body member. Each electrode 13 and 14 includes a plurality of transversely spaced longitudinally extending fingers 16 which interdigitate the corresponding fingers of the other electrode.

The electrodes are porous to water molecules and are of a thickness of about 0.003 inch and contain 4 parts by weight of pure carbon black (lamp black) and 6 parts by weight of pure powdered graphite and 9 parts by weight of binder. The carbon mixture is dispersed in or bonded by an adhesive matrix or binder, which is flexible and of low cohesivesness and is anchored and adherent to the sensing layer 16. The binder, for example, comprises cellulose nitrate, butyl acetate, acetone, dicyclohexyl phthalate, ethyl alcohol, citric acid and camphor.

A pair of terminal members 17 and 18 are secured to electrodes 13 and 14 respectively. Each terminal member is formed of gold plated metal and includes a leg section underlying base 11 and is secured thereto by a gold plated metal grommet which registers with corresponding openings in electrodes 13 and 14, base 11, layer 12 and legs 19, the ends of the grommet being upset and tightly engaging the corresponding electrode and terminal leg 19 to effect a good positive electrical connection between the terminals 17 and 18 and electrodes 13 and 14.

In producing the electrodes 13 and 14 and applying them to sensing layer 12 a uniform mixture by weight of 4 parts pure carbon black, 6 parts powdered pure graphite and 9 parts of the binder composition are dissolved and suspended in ethylene glycol monoethyl ether solvent to produce a free flowing gel. The gel is then applied in any suitable manner to the sensing layer 12 in the areas which delineate electrodes 13 and 14, such as by silk screening, and the ethylene glycol monoethyl ether is then rapidly evaporated. It should be noted that the solvent moderately swells layer 12 to insure the imbedding and adherence thereto of the electrodes.

The adhesive composition employed contained the following ingredients in the precentages by weight indicated,

|  |  | Range |
|---|---|---|
| Camphor | 10% | 8% – 12% |
| Acetone | 5% | 3% – 7% |
| Butyl Acetate | 10% | 8% – 12% |
| Cellulose Nitrate | 55% | 45% – 65% |
| Dicyclo Hexyl Phthalate | 5% | 3% – 7% |
| Ethyl Alcohol | 5% | 3% – 7% |
| Citric Acid | 10% | 8% – 12% |

To produce the gel for application to the sensing layer 50 parts by weight of the carbon, adhesive binder composition are admixed with 50 parts by weight of the ethylene glycol monoethyl ether.

In FIG. 3 of the drawing there are illustrated the resistance-relative humidity curves of three sensors. Curve A is the resistance-humidity curve of the sensor produced in accordance with the preferred embodiment described above and represents the characteristics of the transducer at the date of manufacture and for a period of at least 1 year thereafter. No perceptable shift of calibration was noted after 30 days. A humidity sensor differing from the preferred embodiment only in that the electrode composition was different in that it was composed of silver paste in a nonionic adhesive possessed the characteristic curve A at the time of manufacture but after 30 days possessed the characteristic represented by curve C, a shift of more than 25 percent relative humidity in 30 days. Another humidity sensor which differed from the preferred sensor only in that the ratio of carbon black to graphite was 6:4 had an initial characteristic represented by curve A but after 30 days had the resistance relative humidity characteristic represented by curve B, a 30-day shift of about 8 percent relative humidity.

While there has been described and illustrated a preferred embodiment of the present invention, it is apparent that numerous alterations, omissions and additions may be made without departing from the spirit thereof.

What is claimed is:

1. A sensing device comprising a substrate having an electrical parameter responsive to an ambient condition and an electrode adherent to said substrate and including a mixture of carbon black and graphite bonded by a binder.

2. The sensing device of claim 1 wherein the weight ratio of carbon black to graphite is between 2:8 and 6:4.

3. The sensing device of claim 2 wherein said electrode contains between 8 and 12 parts by weight of said carbon black and graphite and between 7 and 11 parts by weight of said binder.

4. The sensing device of claim 2 wherein said electrode is of a thickness between 0.0005 and 0.006 inch.

5. The sensing device of claim 2 wherein said electrode is porous.

6. The sensing device of claim 2 wherein said binder comprises a polymeric resin.

7. The sensing device of claim 6 wherein said polymeric resin comprises a cellulose derivative.

8. The sensing device of claim 2 comprising a contact element secured to said sensing device and having a gold face engaging said electrode.

9. The sensing device of claim 2 including a pair of said electrodes adherent to said substrate and being separated from each other.

10. The sensing device of claim 2 including a body member, said substrate comprising a layer superimposed on said body member and comprising an ion exchange resin or lithium chloride.

* * * * *